United States Patent [19]

Brie et al.

[11] Patent Number: 4,577,329

[45] Date of Patent: Mar. 18, 1986

[54] SELF-ADAPTIVE EQUALIZER FOR BASEBAND DATA SIGNALS

[75] Inventors: Richard Brie, Paris; Loic B. Y. Guidoux, Garancieres, both of France

[73] Assignee: Telecommunications Radioelectriques et Telephoniques T.R.T., Paris, France

[21] Appl. No.: 539,582

[22] Filed: Oct. 6, 1983

[30] Foreign Application Priority Data

Oct. 11, 1982 [FR] France ................ 82 16997

[51] Int. Cl.$^4$ ................ H04B 3/04; H03H 7/30; H03K 5/159
[52] U.S. Cl. ................ 375/14; 333/18
[58] Field of Search ........... 375/14, 18; 333/18; 364/724

[56] References Cited

U.S. PATENT DOCUMENTS

| | | | |
|---|---|---|---|
| 3,792,356 | 2/1974 | Kobayashi et al. | 375/14 |
| 4,225,832 | 9/1980 | Faye | 333/18 |
| 4,384,355 | 5/1983 | Werner | 375/14 |
| 4,388,724 | 6/1983 | Göckler | 375/14 |
| 4,389,623 | 6/1983 | Onishi et al. | 375/14 |

Primary Examiner—Douglas W. Olms
Assistant Examiner—Frank M. Scutch, III
Attorney, Agent, or Firm—Thomas A. Briody; William J. Streeter; Leroy Eason

[57] ABSTRACT

A self-adaptive equalizer for use in a data modem for correcting in the baseband a received data signal. The equalizer comprises a difference circuit for determining the difference between a received signal and a correction signal formed at a sampling frequency by a transversal filter having adjustable coefficients, and which produces a corrected signal which is applied to a decision circuit which recovers the data signal. The output of the decision circuit is applied to the transversal filter, the coefficients of which are adjusted so as to minimize the mean-square value of an error signal. The error signal at each actual sampling instant is formed by deriving the algebraic difference between the value of the corrected signal at that sampling instant and the value thereof at a previous sampling instant, the latter value being first multiplied by the ratio between the value of the recovered data signal at the actual sampling instant and the value thereof at the previous sampling instant.

10 Claims, 5 Drawing Figures

SELF-ADAPTIVE EQUALIZER FOR BASEBAND DATA SIGNALS

BACKGROUND OF THE INVENTION

1. Field of the Invention

The invention relates to a self-adaptive equalizer for use in the receiver of a data modem for correcting in the baseband the data signal received. The equalizer comprises a difference circuit to which is applied the received signal and a correction signal formed at a signal sampling frequency by a transversal filter having adjustable coefficients, the difference circuit producing a corrected signal which is applied to a decision circuit for recovering the data signal. The recovered data signal is applied to the input of the transversal filter, the coefficients of which are adjusted so as to minimize a predetermined function of an error signal derived from the corrected signal.

2. Description of the Prior Art

Obviously, equalizers acting on a baseband data signal find direct usage in modems receiving data transmitted in the baseband. But it is alternatively possible to use equalizers of this type in modems receiving data transmitted by carrier modulation, by having the equalizer act on the baseband signals derived in the receiver by means of demodulation of the received signal.

With respect to the received signal, the equalizer under consideration behaves as a recursive filter whose loop comprises the cascade arrangement of a decision circuit and a transversal filter. In this type of equalizers, commonly known as "Decision Feedback Equalizers", the transversal filter operates, at sampling instants, on the signal supplied by the decision circuit and its coefficients are adjusted in a manner such that it generates at these sampling instants a correction signal which is a copy of the interference signal resulting from the data transmitted preceding the data then present at the input of the receiver. This correction signal is applied to the difference circuit where it is subtracted from the signal received so as to form a corrected signal from which the interference has been removed. The criterion used for adjusting the coefficients of the transversal filter is minimize a predetermined function (generally the mean-square value) of an error signal which is characteristic of the interference signal component of the corrected signal produced by the difference circuit.

In prior art equalizers (see, for example, the article "An Adaptive Decision Feedback Equalizer", published in IEEE Transactions, Vol. COM-19, No. 3, June 1971, pages 281–292), the error signal is formed at each sampling instant as the difference between the corrected signal produced by the difference circuit and the fixed-level data signal recovered by the decision circuit. But the error signal thus formed does not only depend on the interference signal produced by the preceding data signal and still present in the corrected signal until the equalizer has converged, but also on the level of the actual datum also present in the corrected signal as this is the datum to be recovered by the decision circuit. This level may vary as a function of the length of the link and/or the transmission conditions. To ensure that the error signal is characteristic of the interference signal, it is necessary to stabilize in the known equalizers the data level in the signal applied to the equalizer, with the aid of an automatic gain control (AGC) arrangement.

SUMMARY OF THE INVENTION

The present invention provides the means to form in a different manner an error signal which is characteristic of the interference signal, without being dependent on the level of the received data. This permits avoiding the use of an automatic gain control arrangement, which is comparatively expensive and difficult to realize.

According to the invention, in a self-adaptive equalizer used in a modem for correcting in the baseband the data signal received, the coefficients of the transversal filter are modified with the aid of an error sampling signal which is formed at each actual sampling instant by deriving the alegbraic difference between the value of the corrected signal at that sampling instant and the value of the corrected signal at a previous sampling instant, the latter value being first multiplied by the ratio between the value of the recovered data signal at the actual sampling instant and the value of the recovered data signal at the previous sampling instant. The coefficients of the transversal are then modified or not depending on whether the said two values of the recovered data signal both differ from zero or at least one of the said two values is equal to zero.

The equalizer according to the invention renders it possible to suppress interferences in the received data signal, irrespective of the fact whether the received signal results from, at the transmitter end, a multi-level data signal, a two-level data signal or a three-level data signal resulting from the pseudo-ternary encoding of two-level data.

In the case of transmitted two-level data or three-level data resulting from pseudo-ternary encoding, the decision circuit of the receiver can recover data having a positive and a negative level and the error signal $e(n)$ can be formed in a calculating circuit as the difference or the sum of the values of the corrected signals at the actual sampling instant n and at the previous sampling instant, depending on whether the values of the data signal recovered at the actual sampling instant n and at the previous sampling instant have the same sign or different signs.

A particularly simple embodiment of an equalizer according to the invention is obtained by using for the adjustment of the coefficients of the transversal filter the signal $Sgn[e(n)]$, which defines the sign of the error signal $e(n)$ formed, [for example,] as indicated above, for the case of a recovered two-level data signal.

BRIEF DESCRIPTION OF THE DRAWINGS

How the invention may be put into effect will be more fully appreciated from the following description given by way of example with reference to the accompanying drawings in which.

DESCRIPTION OF THE PREFERRED EMBODIMENTS

Figure 1:
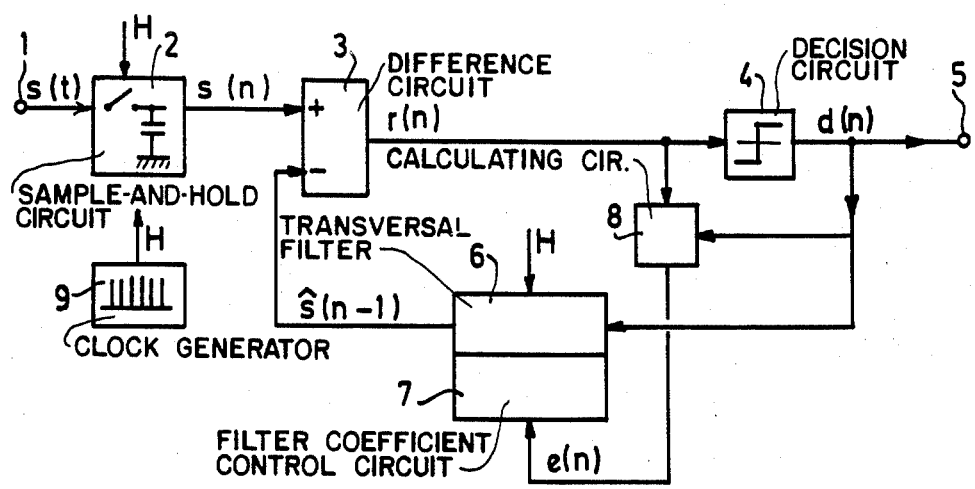
FIG. 1 shows the structure of an equalizer embodying the invention.

FIG. 1 shows the structure of an equalizer of the type formed by a recursive filter in which the decision circuit is comprised in the feedback loop of this filter (Decision Feedback Equalizer).

Let it be assumed that this equalizer is used in the receiver of a baseband data transmission modem. The signal s(t) applied to an input 1 of this equalizer is then the signal received in the receiver and coming from a remote transmitter transmitting a two-level data signal or a three-level data signal resulting from pseudo-ternary encoding of the two-level data or, finally, a multi-level (more than three level) data signal.

In the example shown in FIG. 1, the received data signal s(t) is first sampled in a sample-and-hold circuit 2, at a sampling frequency $H=1/T_e$ ($T_e$ being the sampling period produced by a clock generator 9 which is synchronized by known means with the frequency of the received data. In the majority of known baseband equalizers the sampling frequency H is equal to the data frequency. By defining the sampling instants $nT_e$ by the integer n, the sampled signal appearing at the output of the sampling circuit 2 may be designated as s(n). For the sake of simplicity of the circuit diagram of FIG. 1, let it be assumed that processing the sampled signal s(n) in the equalizer is effected in the analog mode.

Because of the amplitude and/or phase distortions which may affect the transmission medium between the transmitter and the receiver, the received signal s(n) at instant n does not only depend on the datum d(n) transmitted at the same instant n, but on a certain number of data transmitted before the instant n.

The received signal s(n) may therefore be written:

$$s(n) = \sum_{i=0}^{N} t_i \cdot d(n-i) \quad (1)$$

In this formula, $t_i$ represents the samples of the impulse response of the transmission medium, at the instants i extending from the reference instant O to the instant N; for the instants i such as i>N, these samples are assumed to have zero value. Further, d(n−i) represent the data transmitted at the instants (n−i).

It is useful for the following description to write formula (1) as:

$$s(n) = t_o \cdot d(n) + \sum_{i=1}^{N} t_i \cdot d(n-i) \quad (2)$$

In this formula (2), $t_o$ is the centre sample of the impulse response of the transmission medium (or the transmission coefficient of this medium) and the term $t_o \cdot d(n)$ represents the contribution to the received signal s(n) of the data d(n) transmitted at the same instant n. The term of the sum $$\sum_{i=1}^{N} t_i \cdot d(n-i)$$

represents the contribution to the received signal s(n) of the data preceding the instant n and transmitted at the instants n−1 to n−N.

This last term corresponds in the received signal to an unwanted signal, often denoted the interference signal, which may considerably hinder the correct recovery of the data d(n). The equalizer of the invention has for its object to produce a correction signal consisting of a copy of the interference signal and to subtract this correction signal from the received signal so as to obtain a corrected signal in which the interference signal is substantially cancelled.

The equalizer shown in FIG. 1 comprises for that purpose a difference circuit 3 which receives at its (+) input the received signal s(n) and at its (−) input the correction signal $\hat{s}(n-1)$, and produces the corrected signal $r(n)=s(n)-\hat{s}(n-1)$. It may be noted here that the correction signal intended to correct the signal s(n) at an instant n is designated as $\hat{s}(n-1)$ since, as will become evident hereinafter, it is calculated with the aid of data preceding instant n; specifically from the datum d(n−1). This corrected signal is applied to a decision circuit 4 which, when the equalizer has converged, recovers the data d(n) applied to the receiver. If the data d(n) have a positive and a negative level, the decision circuit 4 produces a signal which is the sign of corrected signal r(n), thus Sgn[r(n)]. When the data d(n) have been encoded in a pseudo-ternary code before being transmitted, the decision circuit 4 produces a signal having a positive and a negative level which corresponds to the three-level signal of the pseudo-ternary code. If, finally, the data d(n) are of the multi-level type, the decision circuit 4 produces a signal having the same levels as the transmitted data. The signal recovered by the decision circuit 4 is conveyed to the output terminal 5 of the equalizer. At the same time, this recovered signal is applied to the input of a transversal filter 6, which operates at the sampling frequency H and has for its object to produce the correction signal $\hat{s}(n-1)$, applied to the (−) input of the difference circuit 3. The transversal filter 6 is arranged in the usual way for storing, at each instant n, the N samples of the data signal d(n−i) previously recovered by the decision circuit 4 and for producing the output sample correction signal $\hat{s}(n-1)$ in accordance with the expression:

$$\hat{s}(n-1) = \sum_{i=1}^{N} h_i d(n-i) \quad (3)$$

$h_i$ representing the coefficients of the filter.

The coefficients $h_i$ of the filter are controllable and are adjusted by a control circuit 7 so as to minimize a predetermined function of an error signal e(n) which is derived by a calculating circuit 8 and which must be characteristic of the interference signal component of in the corrected signal r(n) as long as the equalizer has not converged. The way of calculating the error signal will be explained hereinafter. Generally, the coefficients of transversal filter 6 are adjusted in such a way as to mimimize the mean-square value of the error signal e(n), thus $E[|e(n)|^2]$. In that case, using a gradient algorithm, the coefficients $h_i$ are adjusted by successive iterations, in accordance with the recursion formula:

$$h_i(n+1) = h_i(n) + \alpha \cdot E[d(n-i) \cdot e(n)] \quad (4)$$

In this formula (4), $\alpha$ is a coefficient less than 1.

In practice, to avoid the necessity to calculate an average value, which operation is indicated by the operator E, the recursion formula $$h_i(n+1) = h_i(n) + \beta \cdot d(n-i) \cdot e(n) \quad (5)$$

is preferably used. In this formula, $\beta$ is a fixed coefficient having a value small with respect to 1 which conditions the magnitude of the modifications to be applied to the coefficients $h_i(n)$ at the iteration n so as to obtain the coefficients $h_i(n+1)$ at the iteration $(n+1)$.

Figure 2:
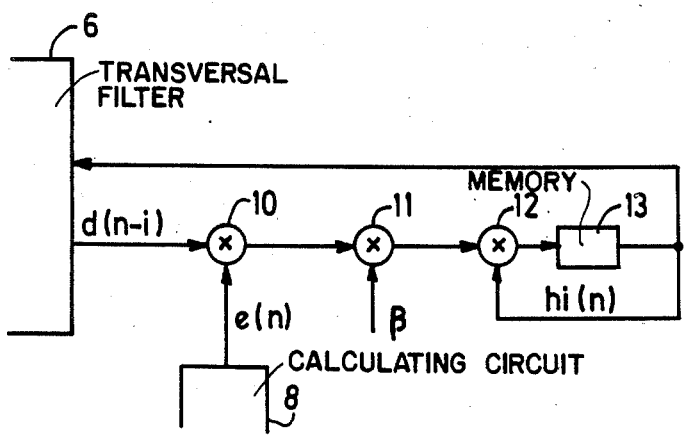
FIG. 2 shows the diagram of a circuit for adjusting any coefficient of the transversal filter of the equalizer in FIG. 1.

The practical recursion formula (5) can be utilized in the control circuit 7, in accordance with the circuit diagram shown in FIG. 2 for controlling any coefficient $h_i$. The data signal $d(n-i)$ stored in a memory location of transversal filter 6 is applied to a multiplying circuit 10 to be multiplied by the error signal $e(n)$ derived in calculating circuit 8. The product thus formed is applied to a multiplying circuit 11 be multiplied by the fixed coefficient $\beta$. The modifying term $\beta \cdot d(n-i) \cdot \epsilon(n)$ thus formed is applied to an accumulator formed by an adding circuit 12, and the memory 13 producing a delay of one sampling period $T_e$. The adding circuit forms the sum of the modifying term calculated at the instant n and the coefficient $h_i(n)$ appearing at the output of memory 13 at the instant n. This sum, which is available at the output of memory 13 at the instant $n+1$, constitutes the $h_i$ coefficient for transversal filter 6 at the instant $n+1$, denoted $h_i(n+1)$.

To adjust the coefficients $h_i$ it is alternatively possible to use a recursion formula which is simpler than formula (5) by replacing therein the error signal $e(n)$ by its sign, which may be written as $Sgn[e(n)]$. The recursion formula (5) then becomes:

$$h_i(n+1) = h_i(n) + \beta \cdot d(n-i) \cdot Sgn[e(n)] \quad (6)$$

In prior art equalizers, for example in the equalizer described in the above-mentioned article in IEEE Transactions, the error signal $e(n)$ used to adjust the coefficients $h_i$ in accordance with any of the recursion formulae (4), (5) or (6), is determined by forming the difference between the signal recovered by the decision circuit 4 and the corrected signal $r(n)$ produced by the difference circuit 3. From the formulae (2) and (3) it can be derived that the corrected signal $r(n) = s(n) - \hat{s}(n-1)$ may be written:

$$r(n) = \left[ \sum_{i=1}^{N} (t_i - h_i) d(n-i) \right] + t_0 \cdot d(n) \quad (7)$$

In this formula, the first term between brackets is the residual interference signal subsisting in the corrected signal $r(n)$ as long as the equalizer has not fully converged and the second term $t_0 \cdot d(n)$ corresponds to the transmitted data $d(n)$ weighted by the transmission coefficient $t_0$ of the transmission medium, that is to say it corresponds in practice to the level of the received data. From this the limitations in employing the prior art equalizers will be apparent. In these equalizers, the error signal $e(n)$ formed by the difference between the fixed-level signal recovered by the decision circuit and the corrected signal $r(n)$ does not only depend on the residual interference signal, as it should do, but also on the level $t_0 \cdot d(n)$ of the received data. In the case in which the transmission coefficient $t_0$ is variable, the known equalizers function poorly and cannot cancel the interference signal. To obtain a correct performance with these equalizers an AGC device must be used which stabilizes the level of the signal $s(t)$ applied to the equalizer.

The present invention provides a different means for calculating the error signal $e(n)$, which does not depend on the level of the received signal and which consequently does not have the disadvantages of the prior art equalizers.

In the equalizer according to the invention, the error signal $e(n)$ used to modify the coefficients $h_i$ of transversal filter 6 is formed at each sampling instant n by deriving the algebraic difference between the value of the corrected signal $r(n)$ at the instant n and the value of the corrected signal produced at a sampling instant preceding the instant n, this last value first being multiplied by the ratio of the value of the data $d(n)$ recovered by decision circuit 4 at the instant n and the value of the data recovered at the said previous sampling instant. The considered previous sampling instant may be, for example, the sampling instant $n-1$ which just precedes the instant n and in that case the error signal $e(n)$ can be expressed by the formula:

$$e(n) = r(n) - r(n-1) \cdot \frac{d(n)}{d(n-1)} \quad (8)$$

It will be clear that in this formula, multiplying the preceding value $r(n-1)$ of the corrected signal by the ratio $d(n)/d(n-1)$ has for its object to "standardize" this preceding value relative to the present value $r(n)$ of the corrected signal, so that the difference has always the same significance, independent of the value of the data. When the data signal recovered by decision circuit 4 does not have a zero level, modifying the coefficients is effected at all sampling instants with the error signal $e(n)$. This occurs, for example, for multi-level data without a zero level, or for two-level data or for pseudoternary encoded data. When the data signal recovered by the decision circuit 4 is of the type which does have a zero level, modifying the coefficients is effected in accordance with the formula (8) only at sampling instants when both values $d(n)$ and $d(n-1)$ of the data differ from zero, and is not effected at sampling instants when at least one of these two values is equal to zero.

Figure 3:
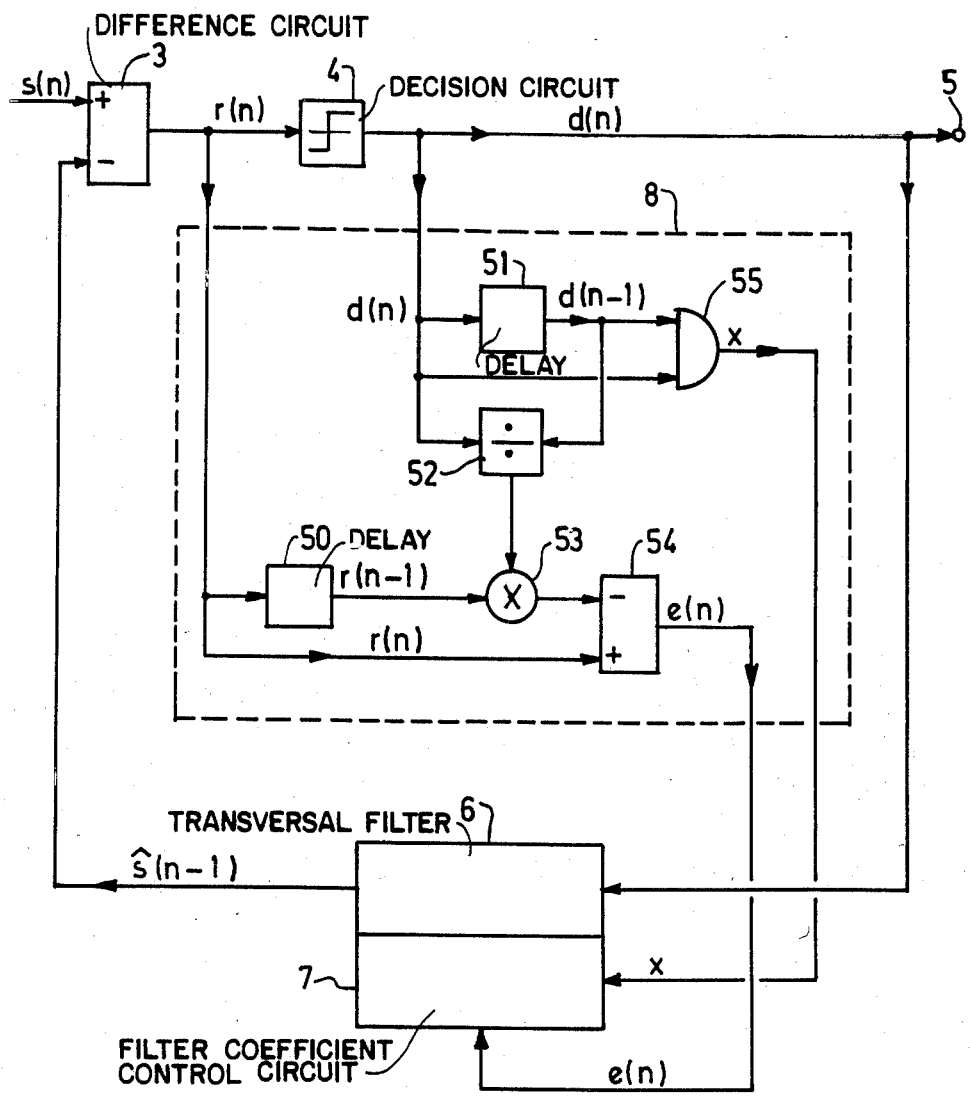
FIG. 3 shows for a general case the basic circuit diagram of an equalizer according to the invention.

Putting the invention into effect in the general case can be effected by a circuit as shown in FIG. 3. In this FIG. 3, the main elements of the equalizer of FIG. 1 have been given the same reference numerals and the circuit diagram of circuit 8 for calculating the error $e(n)$ according to the invention is added. The corrected signal produced by difference circuit 3 is applied to a delay circuit 50 which produces a time delay equal to, for example, one sampling period, so that at a sampling instant n the values $r(n)$ and $r(n-1)$ of the corrected signal are obtained at the input and at the output of this delay circuit 50. The data recovered by decision circuit 4 are applied to a delay circuit 51 which also produces a time delay equal to one sampling period, so that at the instant n the values $d(n)$ and $d(n-1)$ of the data are obtained at the input and at the output of this delay circuit 52. The ratio $d(n)/d(n-1)$ is formed in a circuit 51. A multiplying circuit 53 produces the product $r(n-1) \cdot d(n)/d(n-1)$ which is applied to the $(-)$ input of a difference circuit 54. At its $(+)$ input, this difference circuit 54 receives the quantity $r(n)$ and thus supplies in accordance with formula (8) the error signal $e(n)$ which is applied to coefficient control circuit 7 of transversal filter 6. Moreover, and AND-gate 55 has its two inputs respectively connected to the input and the output of delay circuit 51. AND-gate 55 produces a logic signal x, which authorizes the modification of the coefficients by the error signal $e(n)$ when both data values $d(n)$ and $d(n-1)$ differ from zero and inhibits this modification when at least one of these values d(n) and d(n−1) is equal to zero. The logic signal x may, for example, cancel the modifying term of the coefficients applied to adding circuit 12 (see FIG. 2), when the modification is not authorized.

In the case in which the transmitted data signal has two levels or three levels resulting from a pseudoternary encoding of two-level data, decision circuit 4 recovers the two-level data having a negative and a positive level in the form of the sign of the corrected signal r(n). In this case the signal e(n) of formula (8) may have the form:

$$e(n) = r(n) - r(n-1) \cdot \text{Sgn}[r(n)] \cdot \text{Sgn}[r(n-1)] \qquad (9)$$

It follows therefrom that it is possible to base the calculation of the error signal e(n) on the relations:

$$(10) \begin{cases} e(n) = r(n) - r(n-1) & \text{if } PS(n) > 0 \\ e(n) = r(n) + r(n-1) & \text{if } PS(n) < 0 \end{cases}$$

where $PS(n) = \text{Sgn}[r(n)] \cdot \text{Sgn}[r(n-1)]$.

It will now be demonstrated that if the coefficients $h_i$ of the transversal filter of the equalizer are adjusted so as to minimize the mean-square value of the error signal e(n) formed as described above, that is to say they are adjusted in accordance with the recursion formulae (4) or (5) by using therein this error signal e(n), these coefficients $h_i$ converge towards the samples $t_i$ of the impulse response of the transmission medium, i extending from 1 to N, which indicates that the interference signal is cancelled, without the variations of the central coefficient $t_o$ of this impulse response being troublesome as in prior art equalizers. For the sake of simplicity, let it be assumed for this demonstration that the data recovered by decision circuit 4 have two levels (+1 and −1) and that consequently the error signal e(n) may be expressed by formula (9).

When formulating the corrected signal r(n−1) at the instant n−1 in the same way as the corrected signal r(n) at the instant n in accordance with formula (7), it is obtained that:

$$r(n-1) = \left[ \sum_{i=1}^{N} (t_i - h_i) \cdot d(n - i - 1) \right] + t_o \cdot d(n-1) \qquad (11)$$

Similar to formula (7), this formula (11) assumes that the coefficients $t_i$ of the impulse response of the transmission medium are zero for the case in which i>N.

Let it now be assumed that in the corrected signal r(n) the contribution of the data d(n) coming from the transmitter is predominant. As these data d(n) have the value +1 or −1, it is obtained with this hypothesis that:

$$\text{Sgn}[r(n)] = d(n) \text{ and } \text{Sgn}[r(n-1)] = d(n-1)$$

and that the error signal e(n) in accordance with formula (9) may be written:

$$e(n) = r(n) - r(n-1) \cdot d(n) \cdot d(n-1)$$

By using the formulae (7) and (11), the error signal e(n) may then be written:

$$e(n) = \left[ \sum_{i=1}^{N} (t_i - h_i) \cdot d(n - i) \right] + t_o d(n) -$$

$$\left[ \sum_{i=1}^{N} (t_i - h_i) \cdot d(n - i - 1) \right] d(n) \cdot d(n-1) -$$

$$t_o \cdot d(n-1) \cdot d(n-1)$$

that is to say, taking into account that $d(n-1) \cdot d(n-1) = 1$ when the data are equal to +1 or −1:

$$e(n) = \left[ \sum_{i=1}^{N} (t_i - h_i) \cdot d(n - i) \right] - \qquad (12)$$

$$[\Sigma (t_i - h_i) \cdot d(n - i - 1)] d(n) \cdot d(n-1)$$

So this last formula shows that the error signal e(n) is independent of the transmission coefficient $t_o$ of the transmission medium when the sign of the corrected signal is determined by the sign of the data coming from the transmitter. It seems perfectly justified to assume that this hypothesis is verified, at least at certain sampling instants and optionally after a training period of the equalizer.

The convergence of the equalizer according to the invention will now be demonstrated, using the error signal e(n) in accordance with the formula (9) for the adjustment of the coefficients $h_i$ of the transversal filter. As in all equalizers, let it be assumed that the transmitted data d(n) are statistically independent, which is verified in practice for random data.

So as to simplify the formula, the vectorial notation will be used, by defining for the respective transposes of the vectors $\vec{t}$, $\vec{h}(n)$, $\vec{D}(n)$ and $\vec{D}(n-1)$ that:

$$\vec{t} = [t_1, t_2, \ldots t_N]$$

$$\vec{h}(n) = [h_1(n), h_2(n), \ldots h_N(n)]$$

$$\vec{D}(n) = d(n-1), d(n-2), \ldots d(n-N)]$$

$$\vec{D}(n-1) = [d(n-2), d(n-3), \ldots d(n-N-1)]$$

With this notation, the error signal e(n) in accordance with formula (12) is written:

$$e(n) = \vec{D}(n) [\vec{t} - \vec{h}(n)] - \vec{D}(n-1) [\vec{t} - \vec{h}(n)] \cdot d(n) \cdot d(n-1) \qquad (13)$$

Moreover, the recursion formula (4) used to adjust the coefficients of the transversal filter is written in vectorial notation:

$$\vec{h}(n+1) = \vec{h}(n) + \alpha \cdot E[\vec{D}(n) \cdot e(n)] \qquad (14)$$

By using the expression of e(n) given by the formula (13), it is obtained for the average value $E[\vec{D}(n) \cdot e(n)]$ occurring in formula (14) that:

$$E[\vec{D}(n) \cdot e(n)] = [\vec{t} - \vec{h}(n)] \cdot E[\vec{D}(n) \cdot \vec{D}(n)] - [\vec{t} - \vec{h}(n)] \cdot E[\vec{D}(n) \cdot \vec{D}(n-1) \cdot d(n) \cdot d(n-1)]$$

In this expression of $E[\vec{D}(n) \cdot e(n)]$, the second term is equal to zero. Actually, the matrix $\vec{D}(n) \cdot \vec{D}(n-1)$ does not comprise any component containing the data d(n) and its components multiplied by $d(n) \cdot d(n-1)$ all have an average value equal to zero in the hypothesis made, in which the data are statistically independent. With this same hypothesis, it can be demonstrated that the matrix $E[\vec{D}(n)\cdot\vec{D}(n)]$ may be written $\mathbb{I}\cdot\sigma^2$, $\mathbb{I}$ being the identity matrix and $\sigma^2$ being a factor characterizing the power of the data. In these conditions, the recursion formula (14) may be written:

$$\vec{h}(n+1) = \vec{h}(n) + \alpha[\vec{t} - \vec{h}(n)]\sigma^2$$

The conventional form of this recursion formula makes it possible to write, when n tends to infinity that:

$$\vec{h}(n) = [1-\alpha\sigma^2]^n + \vec{t}$$

With a coefficient $\alpha$ chosen to be sufficiently small so as to ensure that $\alpha\sigma^2 < 1$, it is obtained in practice that $\vec{h}(n) \approx \vec{t}$ for a sufficiently high number of iterations n, which is proof of the convergence of the equalizer.

So far, the case has been described in which, to calculate the error signal e(n) at a sampling instant n, the values of the corrected signal and of the recovered data at the instant n and at a previous sampling instant n−1, which just precedes instant n, are used in accordance with formula (8). In this case, the error signal is calculated at the sampling rate, which is the rate at which the output samples of the transversal filters are calculated. But it is alternatively possible to use, for the calculation of the error signal e(n), the values of the corrected signal and of the recovered data at different previous instants preceding the instant n, such as n−2, n−3, ... etc. In this case the error signal can be calculated at a rate lower than the sampling frequency, which does not include the possibility that the transversal filter can operate at the sampling frequency chosen. This technique, makes it possible to have a longer time interval available for the calculation of the error signal, and may be useful when high sampling frequencies must be used. This may, for example, be the case for high-speed baseband data transmission, if a further sampling operation is effected at a frequency higher than the data frequency to effect equalization in a wide band of the received signal.

A particularly simple embodiment of the equalizer according to the invention will now be described with reference to FIG. 4, more specifically with reference to a receiver which recovers data having a positive and a negative level. In this embodiment the coefficients $h_i$ are controlled in accordance with the recursion formula (6) in which the error signal denoted by Sgn[e(n)] is used for calculating the modifying terms of the coefficients, which error signal is produced by calculating circuit 8. The elaboration of quantities Sgn[e(n)] in this circuit 8 is based on the following relations, which are directly derived from the relations (10):

$$(15) \begin{cases} Sgn\ [e(n)] = Sgn\ [r(n) - r(n-1)] & \text{if } PS(n) > 0 \\ Sgn\ [e(n)] = Sgn\ [r(n) + r(n-1)] & \text{if } PS(n) < 0 \end{cases}$$

where $PS(n) = Sgn[r(n)]\cdot Sgn[r(n-1)]$.

Figure 4:
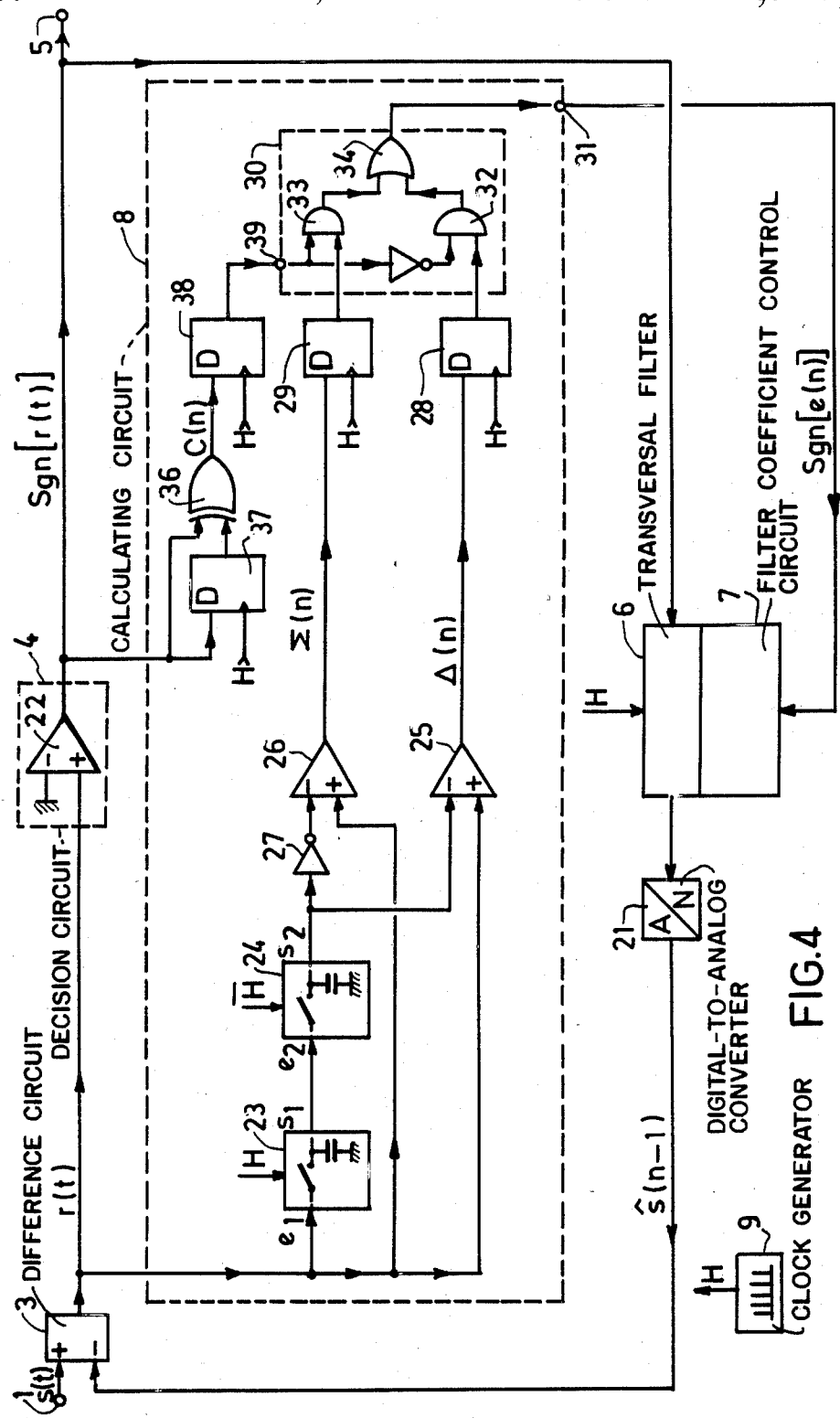
FIG. 4 shows the circuit diagram of an embodiment of an equalizer according to the invention, suitable for use with a receiver recovering a two-level data signal.

In the equalizer shown in FIG. 4, elements having the same functions as those in FIG. 1 have been given the same reference numerals. In this equalizer, the signal s(t) to be equalized is not first sampled as in FIG. 1, but applied directly to the (+) input of difference circuit 3. The (−) input of this difference circuit receives the analog correction signal $\hat{s}(n-1)$ produced at the converter 21, which converts the digital samples supplied by a digital-type transversal filter 6 into analog samples. The corrected signal $r(t) = s(t) - \hat{s}(n-1)$ produced by difference circuit 3 is applied to the (+) terminal of a comparator circuit 22, whose (−) terminal carries the 0 Volt ground potential. Thus comparator circuit 22 determines the sign r(t) and plays the part of decision circuit 4. It recovers a signal Sgn[r(t)] which corresponds to the transmitted data d(n) and has the value +1 or −1 according as r(t) is positive or negative. The data signal recovered by decision circuit 4 is applied to the input of transversal filter 6 in which it is sampled at the sampling frequency $H = 1/T_e$ produced by clock generator 9. The digital samples of the correction signal s(n−1) in accordance with the above formula (3) are calculated in this filter 6.

Figure 5:
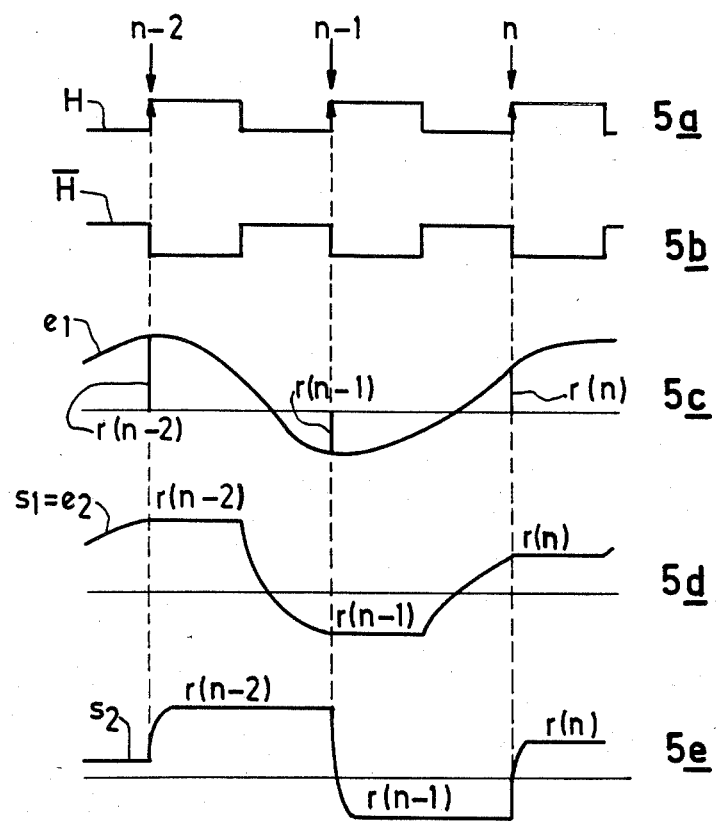
FIG. 5 shows signal diagrams 5a through 5e intended to explain the operation of the equalizer of FIG. 4.

The circuit 8, which has for its object to provide the quantities Sgn[e(n)] in accordance with one of the formulae (15), is formed in the following way. The corrected signal r(t) is applied to the cascade arrangement of two sample-and-hold circuits 23 and 24. The first circuit 23 is activated by the clock signal H having the sampling frequency $1/T_e$ and the second circuit 24 is activated by the complementary signal $\bar{H}$. The operation of this arrangement 23, 24 will now be described with reference to FIG. 5. The diagram 5a represents the clock signal H having ascending edges formed at the instants n−2, n−1 and n. The diagram 5b represents the signal $\bar{H}$. Diagram 5c represents the analogue signal r(t) which is applied to the input $e_1$ of circuit 23 and has the values r(n−2), r(n−1), r(n) at the instants n−2, n−1, n. Let it be assumed that the sampling circuits 23 and 24 are conductive when their control signals H or $\bar{H}$ are in the low state and that they are blocked when these signals are in the high state. The shape of the signal at the output $s_1$ of circuit 23 (that is to say at the input $e_2$ of circuit 24), such as it is shown in diagram 5d, can be derived therefrom. Finally, the shape of the signal at the output $s_2$ of circuit 24, shown in diagram 5e, can be derived from diagram 5d, taking account of a certain signal setting time when circuit 24 becomes conductive. The diagrams of FIG. 5 clearly show that just prior to an ascending edge of the clock H, for example the edge produced at the instant n, the signal at the input $e_1$ of circuit 23 has the value r(n) and the signal at the output $s_2$ of circuit 24 has the value r(n−1).

The signal r(t) is also applied to the (+) input of two comparator circuits 25 and 26. The signal obtained at the output $s_2$ of circuit 24 is applied directly to the (−) input of comparator circuit 25 and, via an inverting amplifier 27, to the (−) input of comparator circuit 26.

Thus, a logic signal $\Delta(n)$ having the values:

$$\Delta(n) = 1 \text{ if } r(n) - r(n-1) > 0$$

and $$\Delta(n) = 0 \text{ if } r(n) - r(n-1) < 0$$

is obtained at the output of comparator circuit 25 just before the ascending edge of the clock H at the instant n.

Simultaneously therewith, a logic signal $\Sigma(n)$ having the values:

$$\Sigma(n) = 1 \text{ if } r(n) + r(n-1) > 0$$

and $$\Sigma(n) = 0 \text{ if } r(n) + r(n-1) < 0$$

is obtained at the output of comparator circuit 26.

Using the convention that the logic values 1 and 0 represent the signs + and −, respectively, the signals $\Delta(n)$ and $\Sigma(n)$ perfectly represent the quantities $Sgn[r(n)-r(n-1)]$ and $Sgn[r(n)+r(n-1)]$ which, in accordance with the formula (15) are necessary to obtain the quantity $Sgn[e(n)]$.

The signals $\Delta(n)$ and $\Sigma(n)$ thus formed are applied to the D-input of flip-flops 28 and 29, respectively, to be sampled on the ascending edges of the clock signal H. The sampled signals $\Delta(n)$ and $\Sigma(n)$ are applied to a switch 30 which, using the formulae (15), is instructed to direct towards an output 31 of calculating circuit 8 either the signal $\Delta(n)$, or the signal $\Sigma(n)$, depending on whether the quantity PS(n) is positive or negative. Switch 30 is formed in the usual way by means of AND-gates 32 and 33, an OR-gate 34 and an inverter 35 arranged as shown in the FIG. 4. The switch is controlled by a logic control signal appearing at its control terminal 39 and being representative of the quantity PS(n). This control signal is formed in the following way: the output signal of decision circuit 4 which represents the quantity $Sgn[r(t)]$ is applied simultaneously to a first input of an Exclusive-OR-circuit 36 and to the D-input of a flip-flop 37 to be sampled at the ascending edges of the clock signal H. The output of flip-flop 37 is connected to the second input of Exclusive-OR gate 36. At the instant n of an ascending edge of the clock signal H, the first input of Exclusive-OR gate 36 then receives the quantity $Sgn[r(n)]$ while its second input receives the quantity $Sgn[r(n-1)]$, stored in the flip-flop 37 at the preceding instant n−1. Thus, at the output of Exclusive-OR gate 36 there is obtained a signal C(n) having the value 1 when the quantity $PS(n)=Sgn[r(n)]\cdot Sgn[r(n-1)]$ is negative and the value 0 when the quantity PS(n) is positive. The signal C(n) is applied to the D-input of a flip-flop 38 to be sampled at the ascending edges of the clock signal H. The output of flip-flop 38 supplies the control signal for switch 30. It will be clear, according to the circuit diagram of this switch, that depending on whether C(n)=1 (i.e. PS(n)<0) or C(n)=0 (i.e. PS(n)>0), either the signal $\Sigma(n)$ or the signal $\Delta(n)$ appears at output terminal 31, after the instant n of the ascending edge of the clock signal H. This signal appearing at output terminal 31 is representative of the quantity $Sgn[e(n)]$ to be utilized in control circuit 7 for setting the coefficients of transversal filter 6.

In the embodiment described above it was assumed that the error signal e(n) was formed at the sampling frequency $H=1/T_e$ determining the operation of the transversal filter on the basis of the consecutive samples r(n) and r(n−1) of the corrected signal. In the case in which it is desired for this error signal to be formed at a lower frequency, for example H/2, that is to say on the basis of the samples r(n) and r(n−2) of the corrected signal, it is sufficient to use in error calculating circuit 8 the clock signal having the frequency H/2, while maintaining the sampling frequency H for transversal filter 6.

What is claimed is:

1. In a self-adaptive equalizer for use in the receiver of a data modem for correcting in the base-band the data signal received, such equalizer being of the kind comprising a difference circuit to which is applied the received signal and a correction signal formed at a sampling frequency by a transversal filter having adjustable coefficients, the difference circuit producing a corrected signal which is applied to a decision circuit for recovering the data signal, the recovered data signal being applied to the input of the transversal filter, the coefficients of the transversal filter being adjusted so as to minimize a predetermined function of an error signal, the improvement characterized in that the equalizer comprises means for adjusting the coefficients of the transversal filter in accordance with an error sampling signal, such error signal being formed at each actual sampling instant n by deriving the algebraic difference between the value of the corrected signal produced by the difference circuit at the sampling instant and the value of the corrected signal produced by the difference circuit at a previous sampling instant, the latter value first being multiplied by the ratio between the value of the recovered data signal at the actual sampling instant and the value of the recovered data signal at the previous sampling instant; such adjustment of the coefficients being effected only for sampling instants at which the said two values of the recovered data signal both differ from zero.

2. A self-adaptive equalizer as claimed in claim 1, characterized in that the actual sampling instant and the previous sampling instant are separated by at least one period of the sampling frequency.

3. A self-adaptive equalizer as claimed in claim 1 characterized in that the coefficients of the transversal filter are adjusted so as to minimize the mean-square value of the said error signal.

4. A self-adaptive equalizer as claimed in claim 3, characterized in that said means for adjusting the coefficients of the transversal filter comprises a control circuit adapted to iteratively adjust each coefficient $h_i$ thereof according to the recursion formula:

$$h_i(n+1)=h_i(n)+\beta \cdot d(n-1)\cdot e(n)$$

$h_i(n)$ and $h_i(n+1)$ being the values of the coefficient $h_i$ at the iterations n and (n+1), $\beta$ being a coefficient less than 1, $d(n-i)$ being a datum stored in the transversal filter and corresponding to the coefficient $h_i$, and e(n) being the said error signal.

5. A self-adaptive equalizer as claimed in claim 4 for correcting a received data signal produced by a transmitted two-level baseband data signal or a transmitted three-level baseband data signal formed by pseudo-ternary encoding of two-level data, whereby the data signal recovered by the decision circuit has a positive and a negative level, characterized in that said means for adjusting the coefficients of the transversal filter further comprises a calculating circuit for forming the error sampling signal e(n) as the difference of the values of the corrected signal produced by the difference circuit at the actual sampling instant n and at a previous sampling instant when the values of the recovered data signals at the actual sampling instant n and at the previous sampling instant have the same sign, and as the sum of the said values of the corrected signal when sad values of the recovered data signal have different signs.

6. A self-adaptive equalizer as claimed in claim 3, characterized in that said means for adjusting the coefficients of the transversal filter comprises a control circuit adapted to iteratively adjust each coefficient $h_i$ thereof according to the recursion formula:

$$h_i(n+1)=h_i(n)+\beta \cdot d(n-1)\cdot Sgn(e(n))$$

Sgn(e(n)) being a signal characterizing the sign of the said error signal e(n).

7. A self-adaptive equalizer as claimed in claim 6 for correcting a received data signal produced by a transmitted two-level baseband data signal or a transmitted three-level baseband data signal formed by Pseudo-ternary encoding of two-level data, whereby the data signal recovered by the decision circuit has a positive and a negative level, characterized in that said means for adjusting the coefficients of the transversal filter further comprises a calculating circuit for forming the error signal e(n) as a signal Sgn(e(n)) signifying the sign of the difference of the values of the corrected signal produced by the difference circuit at the actual sampling instant n and at a previous sampling instant when the values of the recovered data signals at the actual sampling instant n and at the previous sampling instant have the same sign, the signal Sgn(e(n)) signifying the sign of the sum of said values of the corrected signal when said values of the recovered data signal have different signs.

8. A self-adaptive equalizer as claimed in claim 7, characterized in that said calculating circuit for forming the signal Sgn(e(n)) comprises: a cascade arrangement of two sample-and-hold circuits respectively activated by complementary clock signals at a frequency corresponding to the sampling rate at which the signal Sgn(e(n) is formed, the corrected signal produced by the difference circuit being applied to the input of such cascade arrangement; two comparator circuits, the corrected signal being applied to one input of each of such comparator circuits, the output signal of said cascade arrangement being applied to the other input of one of said comparator circuits; and an inverting amplifier for applying the output signal of said cascade arrangement to the other input of the other of said comparator circuits; said two comparator circuits being adapted to respectively form signals $\Delta(n)$ and $\Sigma(n)$ respectively signifying the sign of the difference and the sum of the values of the corrected signal produced by the difference circuit at the sampling instant n and at the previous sampling instant.

9. A self-adaptive equalizer as claimed in claim 8, characterized in that the calculating circuit for forming the signal Sgn(e(n)) further comprises an Exclusive-OR gate and a bistable trigger circuit; one input of said gate receiving the output signal of the decision circuit and the other input thereof receiving the output signal produced by said trigger circuit; said trigger circuit being adapted to sample the output signal of the decision circuit at the sampling rate of the signal Sgn(e(n)) to thereby produce a signal C(n) signifying the product of the signs of the data signal recovered by the decision circuit at the sampling instant n and at a previous sampling instant.

10. A self-adaptive equalizer as claimed in claim 9, further comprising three bistable trigger circuits to which the signals $\Delta(n)$, $\Sigma(n)$ and C(n) are respectively applied, said trigger circuits being adapted to sample such signals at the sampling rate of the signal Sgn(e(n); and a switch to which the samples of the signals $\Delta(n)$ and $\Sigma(n)$ are applied, said switch being controlled by the samples of the C(n) to form the signal Sgn(e(n) from samples of the signal $\Delta(n)$ and samples of the signal $\Sigma(n)$.

* * * * *